April 22, 1947.   B. E. SHAW   2,419,377
THERMOSTATIC CONTROL FOR REFRIGERATION SYSTEMS
Filed May 2, 1942
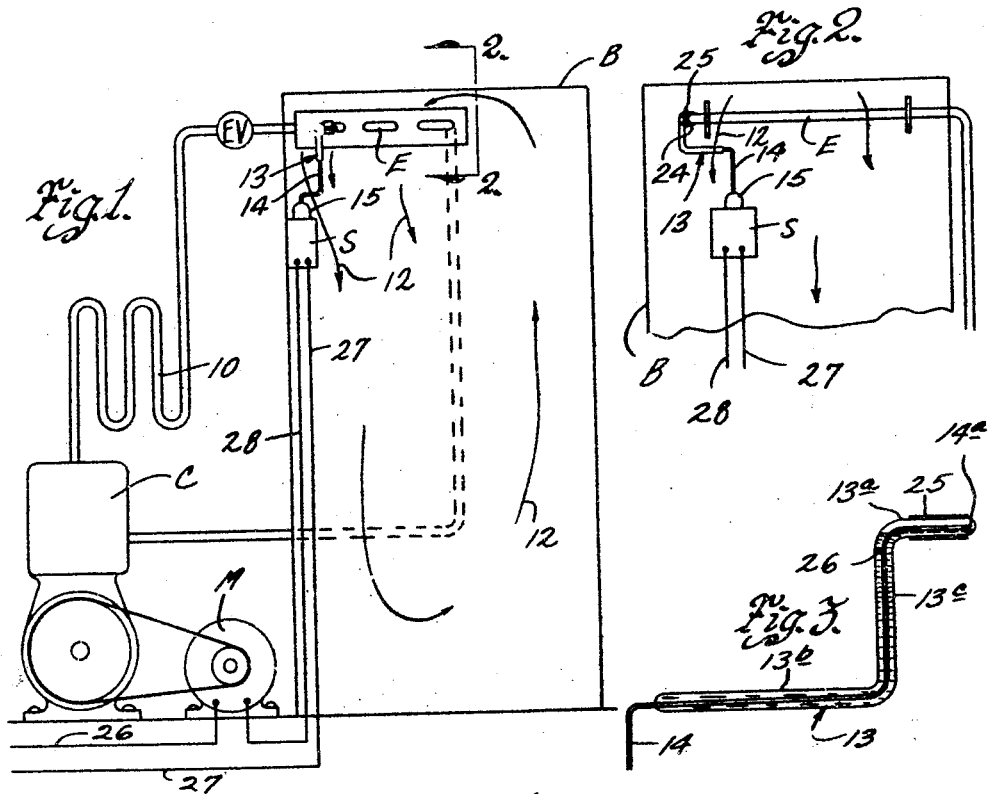
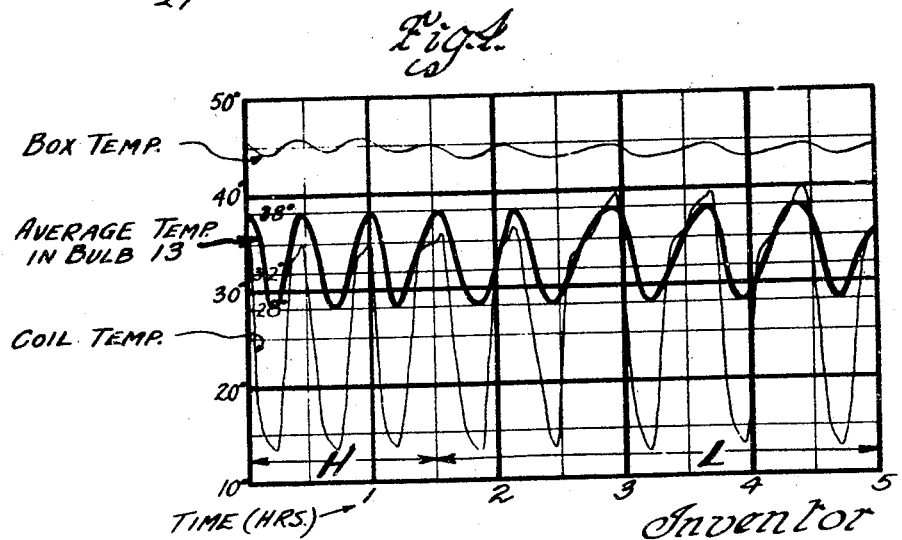
Inventor
Burton E. Shaw
by Bair & Freeman
Atty's Patented Apr. 22, 1947

2,419,377

UNITED STATES PATENT OFFICE 2,419,377

THERMOSTATIC CONTROL FOR REFRIGERATION SYSTEMS

Burton E. Shaw, Bristol, Ind., assignor to Penn Electric Switch Co., Goshen, Ind., a corporation of Iowa Application May 2, 1942, Serial No. 441,521

8 Claims. (Cl. 62—4)

1

My present invention relates to a thermostatic control for refrigeration systems wherein a bellows or the like is responsive to the average temperature in a capillary bulb having different parts thereof responsive to the temperatures of different elements. My present application contains subject matter relating to my copending application Serial No. 397,273, filed June 9, 1941.

One object of the present invention is to provide a thermostatic control which is inexpensive to manufacture and which can be made in the form of a single unit to take the place of two or more units as now used in temperature controlling installations wherein one unit is responsive to the temperature condition of one element and another unit is responsive to the temperature condition of another element.

Another object is to provide a system of the character disclosed which consists of an elongated bulb, a capillary tube extending from one end thereof and a control device controlled by pressure from the capillary tube, the bulb being arranged to have one portion thereof responsive, as by direct thermal conduction, to the temperature of a certain portion of an evaporator coil or other element chilled by the refrigerant, and its remaining portion responsive to the temperature of something else such as air chilled by such refrigerant, said remaining portion being positioned to respond to such chilled air as it drops off the evaporator coil so that if the temperature of the air in the box is high, the control will cut in at a lower coil temperature than normal as when the control is responding to the evaporator temperature alone. If the temperature of the air in the box is low, the control will cut in at a higher coil temperature, thus, in effect, providing a "cold anticipation" feature.

Still another object is to provide a bulb design wherein the bulb is dependent on an average of coil temperature and chilled air temperature in the box for operating a control device with the control device cutting out at a lower evaporator temperature as the load in the box increases, whereby the box temperature remains substantially uniform, regardless of load.

A still further object is to provide a thermostatic control having a "selective defrosting" feature which produces an automatic defrosting of the evaporator coil during light or normal loads, and only a partial defrosting thereof when the box is heavily loaded and until such time as the load is reduced to normal.

Still a further object is to provide a satisfactory control for all above-freezing refrigerated spaces, such as walk-in coolers, reach-in boxes, florists' boxes, display cases and the like, which need not be adjusted for change-over to respond properly to summer or winter conditions, and a control device in which, at the same time, a desired type of automatically regulated defrosting cycles is obtained without complicated timing devices, auxiliary temperature control devices, ice formation responsive devices, and the like.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a diagrammatic view showing my thermostatic control for refrigerating systems;

Figure 2 is a diagrammatic view on the line 2—2 of Figure 1, showing further details of the relationship between my control and the evaporator coil and refrigerated space around it;

Figure 3 is a diagrammatic sectional view of the bulb used in my bulb and tube system; and Figure 4 is a graphic view showing temperature changes of an evaporator coil, of a refrigerated space, and of the control bulb in a refrigeration system, wherein my control device is used under varying operating conditions.

On the accompanying drawing I have used the reference character M to indicate a motor for a refrigerant compressor C. The compressor C pumps refrigerant through a condenser 10, an expansion valve EV and an evaporator coil E. The coil E is mounted in a box B so that there is thermal air circulation, as indicated by the arrows 12.

My capillary and bulb system consists of a bulb 13, a capillary tube 14 connected with one end thereof, and a control device such as an electric switch, indicated generally at S. As shown in Figure 3, the capillary tube 14 extends inside the bulb 13 so that it terminates adjacent the dead end thereof, such dead end being indicated at 13ª. The terminating end of the capillary tube within the bulb is indicated at 14ª (see Figure 3). The bulb is charged with a suitable charging liquid 26 to effect temperature control. The liquid 26 substantially fills the bulb (about seven-eighths of it), as shown in Figure 3. The charging liquid arrangement thus differs from conventional in that there is a greater volume of charging liquid in proportion to the inside capacity of the bulb.

The switch S includes a bellows and bellows chamber 15 whereby the switch is responsive to changes in pressure transmitted thereto from the capillary tube 14. The switch S is the usual bellows type, such as shown in my Patent No. 2,269,864, issued January 13, 1942. I have found that it works best when it has a relatively wide differential of operation. The switch S controls the circuit of the motor M in the usual manner. The circuit wires being indicated at 26, 27 and 28.

The bulb 13 has its dead end 13ª connected in good thermal conducting relation to the evaporator E as by metal clamp plates 24 (see Figure 2). Clamp screws 25 are used to clamp the plates 24 in tight engagement with the surfaces of the evaporator coil and the bulb, as fully disclosed in my parent application. I have found that the bulb end 13ª works best when placed on the evaporator coil relatively closer to the expansion valve EV than to the outlet end of the coil. In most evaporator coil installations this would be one coil length from the expansion valve, as the expansion valve is usually at the back of the box and the coil extends forwardly therefrom, and, of course, the most convenient place on the evaporator coil to get at would be at the front of the box. The position of the bulb 13 may be varied considerably and still obtain satisfactory results, but should be as close as feasible to the expansion valve.

Heretofore, attempts have been made to operate a refrigerant compressor motor control switch as a resultant of two temperatures, such as the evaporator coil temperature and the air temperature within the box. Two bulbs and two capillary tubes have been provided, with the tubes both connected to the bellows chamber. Difficulty has always been experienced because the evaporator bulb is coldest, and, accordingly, the liquid in the bulb and the tube system condenses in it. The air bulb is always warmer than the evaporator bulb, and, accordingly, aids in driving the liquid over to the cold bulb due to vaporization in the air bulb. The air bulb accordingly takes on complete control of the control switch.

In still other installations, single bulbs have been used for responding predominantly to air temperature as the bulb is mounted in the air stream but close enough to the evaporator so that ice forming on the evaporator builds out to the bulb and then a non-normal operation occurs, causing a refrigerant compressor motor to be shut off for an extended period of time, thus defrosting the coil. A control of this type normally responds to air temperature and only in special cases responds to another temperature, and at such times it is the formation of ice that it responds to, as distinguished from the control of the device responding to an average temperature such that under light and normal loads defrosting each cycle of operation occurs as in my device with partial defrosting each cycle when the load in the box is relatively heavy. By making the bulb 13 elongated so that one part of it is directly responsive through thermal conduction to the temperature of the evaporator coil, this portion assumes the temperature of the coil, and by then arranging the remaining portion so that it is responsive to air dropping off the evaporator coil, such remaining portion assumes the temperature of the chilled air as it drops away from the evaporator coil. Accordingly the control switch at all times responds to the average temperature in the bulb 13.

I have found that best results are obtained by having a minor portion of the capillary bulb responsive to the evaporator coil temperature and a major portion thereof responsive to the chilled air temperature, in an arrangement in which the capillary tube extends to a position of termination within the bulb adjacent the far or dead end of the bulb. By then substantially filling the bulb with a liquid fill and arranging the bulb so that its dead end is clamped to the evaporator and its remaining portion depends therefrom, the liquid fill tends to settle in the bulb and to stay out of the capillary tube. This tendency is augmented by the fact that the bulb is colder than the tube and there are thus eliminated slugs of liquid in the capillary tube, resulting in erratic action of the control device. The major portion of the bulb may depend straight down from the clamp portion 13ª thereof as the settling cold air will affect it in this position, but it works a little better when its major portion is installed in a position under the evaporator coil, as indicated at 13ᵇ, the depending portion of the bulb being indicated at 13ᶜ.

In operation, the bellows of the switch S responds to an average pressure in the bulb 13. The tendency in the bulb is for the pressure in the minor portion 13ª to be lower than in the major portion 13ᵇ—13ᶜ. However, as the bulb is comparatively large in diameter, there is a ready equalization of pressure throughout the volume of the bulb immediately after any part of it is raised or lowered in temperature. As a result, the bellows of the switch S responds to only an average of the pressures so that the switch is temperature-sensitive to the combination of both the evaporator temperature and the air temperature. There is a tendency for the motor M to be cut in as the result of a rise in air temperature, a rising evaporator coil temperature, or both, depending on the average pressure developed by such rise. Similarly, the cut-out is accomplished by a reduction in the evaporator coil temperature, air temperature, or both.

My arrangement somewhat shortens the cycles of operation, especially during heavy loading. The cycles however can be lengthened by the proper differential of operation in the control switch S. I have found that better results are obtained by having the switch provided with a wide differential of operation. The control of the switch is more accurately responsive to conditions which cause the refrigeration system to so operate that better humidity conditions, as well as defrosting conditions, are secured. The wide differential adjustment provides for a better defrosting of the coil during each cycle of operation, as will hereinafter appear.

Figure 4 is a graph illustrating "Coil temperature" and "Box temperature" curves under two different conditions—H (heavy load), and L (light load). Both coil temperature and box temperature are shown. Since the temperature which actually causes the operation of the control switch S is neither the box temperature nor the coil temperature, but a combination of these two, we may assume that the control switch S is set to close the circuit at 38 degrees bulb temperature and open it at 28 degrees. If the compressor C has been off for some time so that all frost has melted off the evaporator coil, we find that the box temperature is at, for instance, 46 degrees, and since the coil has completely defrosted the coil temperature may be at 35 degrees. The combination of this coil temperature and the higher box temperature produces an averaging effect in the bulb 13 which brings the temperature of the bulb to 38 degrees. The control will therefore start the compressor.

As soon as the compressor starts it will begin to cool down the temperature of the evaporator coil E, and as the temperature of the coil passes the freezing point, frost will collect. As the coil becomes colder and colder, it will exert more and more influence on the average temperature of the bulb 13 so that it drops finally to 28 degrees. The compressor will then stop, due to the reaching of the "Average temperature" indicated on Figure 4. I have found that the coil temperature at which the compressor is turned off is practically constant regardless of the load on the box, which, of course, is a very desirable feature. This means that the coil is prevented from becoming extremely cold even under heavy load conditions. Instead of maintaining an extremely cold coil, the average temperature is lowered by preventing complete defrosting on the next cycle and by increasing the number of running periods.

It will be noted that there is some rise in the average box temperature during heavy load conditions H, but that this rise in temperature is not great and that the box temperature is maintained closely within predetermined limits. It will also be noted that during the period of heavy load the coil temperature at the cut-in point does not go far above the defrost temperature. This comes about in the following manner:

The compressor now being off, the coil temperature will begin to rise since it will be receiving heat from the air in the box. Because there is a heavy load the temperature rise will be rapid. The compressor will therefore be started before the evaporator coil has attained a fully defrosted temperature. In the chart of Figure 4 the loads H and L were constant, but in practice the load will become lighter from operation to operation, as when articles are removed, one at a time, from a box in which a number of them have been originally placed when stocking up the refrigerated space. As a result, the cut-in point of the switch S will occur at a coil temperature which becomes gradually higher, until the point for complete defrosting each cycle is reached. Usually two or three cycles are sufficient. Under practical conditions there is no possibility of the control switch S completely preventing defrosting, provided the evaporator coil is the proper size for the installation.

If it is found that the temperature rise is too much under heavy load conditions, it is possible to compensate for this by decreasing the amount of "cold anticipation." This is done by lessening the contact between the bulb and the evaporator coil. To do this it is necessary only to loosen the clamp screws 25 and slide the bulb portion 13a out enough to reduce the area of contact between the bulb and the clamp. The maximum length of this contact area of the clamp, I have found, should be about two inches, with an overall bulb length of approximately twelve inches. As a general rule, installation should be made with the bulb inserted so that its outer end is flush with the end of the clamp, the reduction in contact area being made only if it is found necessary.

During the periods of light loads much the same operation takes place, except that on the "off" cycle full defrosting temperature of the coil is reached, and as the ice melts it takes over the refrigeration work, causing the compressor to remain off for a somewhat longer period. At no time, however, does ice build out to the bulb. In Figure 4 it will be noted that the "on" periods are of practically equal length, which is important in order to prevent excessive frosting. My control, therefore, does have a very definite advantage in preventing excessive frosting and preventing dehydration of the refrigerated space. The inherent operation of the device is such that "selective defrosting" is secured automatically, as defrosting is delayed until a period of light load so that the effectiveness of the coil in maintaining proper box temperature under all load conditions will not be affected.

The inherent "cold anticipation" of my thermostatic control results from one end of the bulb being attached to the evaporator coil so that the bulb temperature tends to fall as soon as the compressor starts without any drop in the box temperature, thereby anticipating the change in the box temperature. This effects a "smoothing out" of the cycle so that the box temperature varies but little from cycle to cycle.

My control is entirely free from the effect of ambient temperature at the compressor. The compressor temperature has no effect upon evaporator coil or box temperatures, and since these temperatures together effect the operation of the control switch it is obvious that there is no relation to the ambient temperature at the compressor location. The control switch S may be mounted either inside or outside the box, the only precaution, as far as the temperature of the bellows and capillary is concerned, being that the capillary tube should not touch the evaporator coil or suction line. This is to prevent any condensation in the capillary tube.

Adjusting the control switch S is comparatively simple for any given installation. Changing the range adjustment does not seem to have very much affect on the cut-in point in terms of box temperature. Differential adjustment serves mainly as a means of obtaining the proper length of cycle to maintain the desired close box temperature variation. In order to prevent unnecessary "on" and "off" cycling of the compressor it is desirable for the installer to set the adjustable differential of the switch at the maximum or as close to the maximum as will result in maintaining good box temperature control. No readjustment of the control is necessary for periods of light loads or for winter and summer periods.

The user of the box may feel that at certain times he would like to reduce or raise the box temperature slightly. The usual limited range adjustment knob may be placed on the switch S for this purpose, thereby permitting the customer to change the average box temperature within certain narrow limits. The amount of change which he can obtain should not be enough to prevent proper defrosting, and this can be readily determined by a few trials by the serviceman or installer of the control device.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. The combination with refrigeration apparatus comprising an evaporator, a compressor connected to said evaporator and a motor connected to said compressor; of a control system for governing the operation of said apparatus, said system including a thermostatic bulb having a portion arranged below the evaporator in the path of descending air cooled thereby, a clamp securing one end of said bulb to a portion of the evaporator, a capillary tube extending from and open ended within said bulb adjacent the clamped end thereof, said bulb being substantially completely charged with liquid, and a pressure operated control device responsive at all times to pressure variations in said capillary tube resulting from an average of pressures in said minor and major portions of said bulb as resulting from change in temperature of said portion of said evaporator coil to which said clamp is affixed, and the cold air dropping from said evaporator coil respectively, said control device being operatively connected with the refrigerant compressor motor to control it in accordance with the temperatures affecting both said minor and said major portions of said bulb.

2. In combination with refrigeration apparatus comprising an evaporator coil, a compressor connected to said evaporator coil and a motor connected to said compressor; a control system for governing operation of said apparatus and including a bulb having a portion thereof in metallic conducting relationship to a horizontal run of the evaporator coil approximately one coil run removed from the inlet end thereof, said bulb having its remaining portion positioned to be affected by chilled air dropping from the evaporator coil, a capillary tube extending from said bulb, and a pressure operated control device responsive at all times to pressure variations in said capillary tube resulting from an average of pressures in said portions of said bulb as it responds to temperatures of the coil run of the evaporator coil to which it is secured and the chilled air respectively, said control device being operatively connected with the refrigerant compressor motor to control it in accordance with the average temperatures of said bulb portions.

3. The combination with refrigeration apparatus comprising an evaporator coil, a compressor connected to said evaporator coil and a motor connected to said compressor; of a control system for governing the operation of said apparatus, said system including a thermostatic bulb having a dead end, a capillary tube extending from said bulb and open ended inside the bulb closely adjacent said dead end, a metal clamp, said dead end of said bulb being clamped thereby to the evaporator coil removed one coil length from the inlet end thereof, the remaining portion of said bulb being responsive to air dropping from the evaporator coil, and a pressure operated control device for the motor connected with the free end of said capillary tube.

4. The combination with refrigeration apparatus comprising an evaporator, a compressor connected to said evaporator and a motor connected to said compressor; of a control system for governing the operation of said apparatus, said system including a thermostatic bulb having a capillary tube extending from one end thereof and into the bulb to adjacent the other end thereof at which point said tube is open to the interior of the bulb, a control device responsive to pressure from said capillary tube, said bulb having said other end secured in thermal conducting relation to the evaporator, said control device controlling the operation of the motor, said bulb having its remaining portion responsive to air chilled by and dropping from the evaporator and thereby controlling the operation of the refrigeration apparatus in response to an average temperature in said bulb.

5. Apparatus for controlling the operation of a refrigeration system, said apparatus comprising a thermostatic bulb, an electric switch including a chamber having a bellows therein, a capillary tube placing said bulb and said bellows in communication with each other, and a charge of volatile liquid in said apparatus sufficient in amount to almost fill said bulb, said bulb including one portion having a dead end, a second portion extending substantially parallel to said one portion but offset therefrom and a third portion connecting the other two portions, the capillary tube extending through the third and second mentioned portions and having its inlet in said one portion near the dead end thereof.

6. In combination with refrigeration apparatus comprising an evaporator, a compressor connected to said evaporator and a motor connected to said compressor; a control system for governing the operation of said apparatus and including a bulb having a dead end, a capillary tube extending into said bulb and having an open end terminating adjacent said dead end, said dead end being clamped in metal to metal conducting relation to the evaporator, the remaining portion of said bulb being responsive to air circulating first across the evaporator and then over said remaining portion, said capillary tube extending from said remaining portion of said bulb, and a wide differential pressure operated control device for the motor connected with the free end of said capillary tube.

7. In refrigeration apparatus comprising an evaporator, a compressor connected to said evaporator and a motor connected to said compressor; a control system for governing the operation of said apparatus and including an elongated thermostatic bulb having a minor portion at one end thereof clamped and thereby supported in thermal conducting relation to the evaporator and at one side thereof, and a major portion supported by said minor portion and bent to a position under the evaporator whereby it is responsive to the temperature of air dropping off the evaporator, a capillary tube extended from within said bulb, and a control device for the refrigerant compressor motor responsive to average pressure variations in said capillary tube.

8. In combination with refrigeration apparatus comprising an evaporator, a compressor connected to said evaporator and a motor connected to said compressor; a control system for governing the operation of said apparatus and including an elongated thermostatic bulb havin an upper portion supported in good conducting relation on the evaporator, and a lower portion supported by said first portion and positioned under the evaporator, a capillary tube extending from within said bulb adjacent the upper end thereof, and a control device for the refrigerant compressor motor responsive to pressure variations in said capillary tube.

BURTON E. SHAW.

REFERENCES CITED

The following references are of record in the file of this patent:

UNITED STATES PATENTS

| Number | Name | Date |
|---|---|---|
| 2,133,967 | Buchanan | Oct. 25, 1938 |
| 2,135,875 | Morse | Nov. 8, 1938 |
| 2,178,200 | Cannon | Oct. 31, 1939 |
| 2,192,850 | Tobey | Mar. 5, 1940 |
| 2,192,851 | Tobey | Mar. 5, 1940 |
| 2,197,582 | Kaufman | Apr. 16, 1940 |
| 2,230,842 | May | Feb. 4, 1941 |
| 2,279,888 | Hobbs | Apr. 14, 1942 |
| 2,246,956 | Shaw | June 24, 1941 |